J. J. DIHEL.
PLOW-ATTACHMENT FOR POTATO-DIGGERS.

No. 187,460. Patented Feb. 20, 1877.

ATTEST:
O. H. Adix
Emil Adix.

INVENTOR:
John J. Dihel,
By G. L. Chapin
Atty.

UNITED STATES PATENT OFFICE.

JOHN J. DIHEL, OF WASHINGTON, IOWA.

IMPROVEMENT IN PLOW ATTACHMENT FOR POTATO-DIGGERS.

Specification forming part of Letters Patent No. 187,460, dated February 20, 1877; application filed January 15, 1877.

*To all whom it may concern:*

Be it known that I, JOHN J. DIHEL, of Washington, in the county of Washington and State of Iowa, have invented a new and useful Improvement in Plow Attachments for Separating Potatoes from the Earth, of which the following is a specification:

The nature of the present invention consists in a separator composed of a substantial head, to which are secured to its back side a series of long prongs, running level from the head half of their lengths or more, and then inclined upward on an angle of about twenty-two degrees, and terminating on a less angle of about eight degrees. The points of first inclination upward on the prongs form an angle outward and backward from the plow also of about twenty-two degrees, which last angle and the upward-turned prongs, form what may be termed a sifting mold-board, between the prongs forming which the earth is sifted, leaving the potatoes to be thrown off the separator at the outside thereof from the plow.

Figure 1:
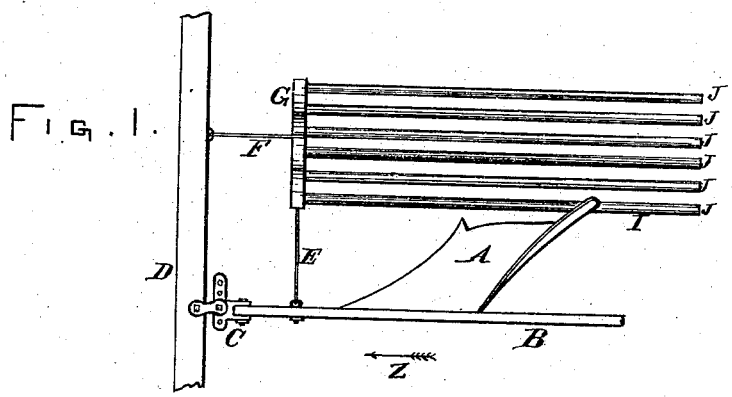
Figure 2:
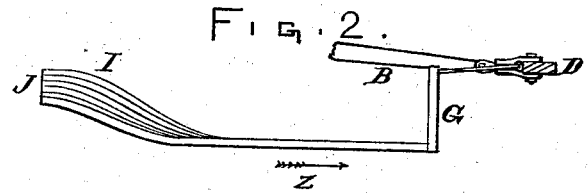
Figure 3:
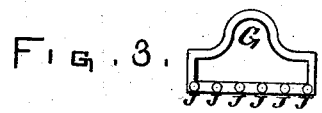

In the drawings, Figure 1 is a plan or top view of a plow-evener attachment and my improvement for separating the potatoes from the earth; Fig. 2, a longitudinal elevation of the separator in position with reference to the plow-beam. Fig. 3 shows an inside elevation of the head of the separator and the position of its prongs.

A represents an ordinary plow mold-board, and B a portion of the beam thereof. D represents the middle part of the draft-evener, also of ordinary construction. G represents what I term the head of the separator, which is made of iron, or other suitable material, and open in the middle, to be light. To this head are secured prongs J J J J J, extending back of the plow, and curved, as shown and above described. The head G is secured to the evener D by means of a cord or chain, F, and the inner end thereof is secured to the plow-beam B by a cord or chain, E, so that the prongs shall pass back closely to the mold-board A, as shown at Fig. 1. And in this position, if the plow be drawn forward in the direction indicated by dart Z, upturning the hills of potatoes, the earth and potatoes will be thrown onto the pronged separator G J, and when passing up and over the incline I will be separated, the earth falling through first and the potatoes falling on top thereof.

It is proper here to state that the chains or cords E F permit the plow to turn freely at the end of rows, or operate properly in crooked rows.

I am aware that pronged potato-diggers and separators have been before in use, but I am not advised that a device as described and shown has ever been known or used.

I claim and desire to secure by Letters Patent—

In combination with a common plow, the separator consisting of the head G and prongs J, curved as described, and attached to the plow-beam and evener, as set forth.

JOHN J. DIHEL.

Witnesses:
   LEE LANGHEAD,
   Z. NICOLA.